(No Model.)
W. F. BUSWELL.
PULLEY.
No. 469,512. Patented Feb. 23, 1892.
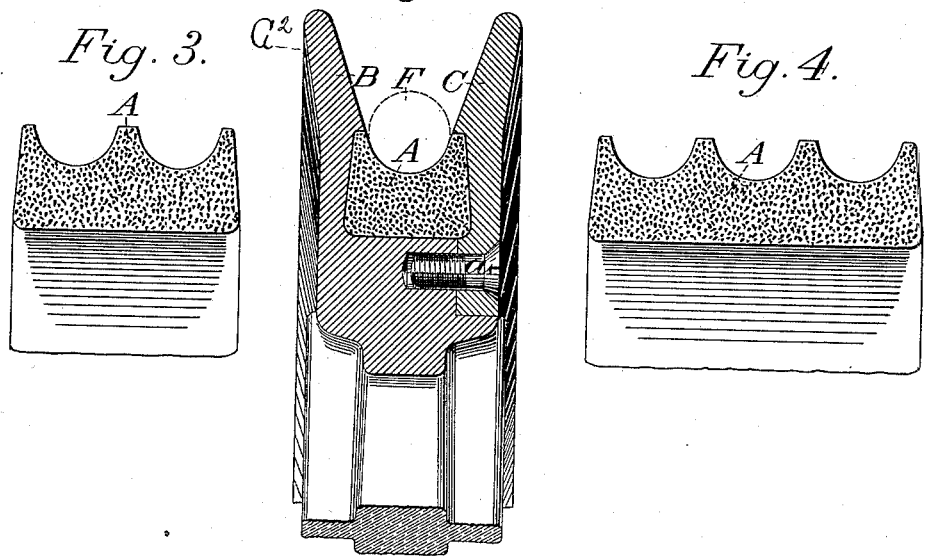
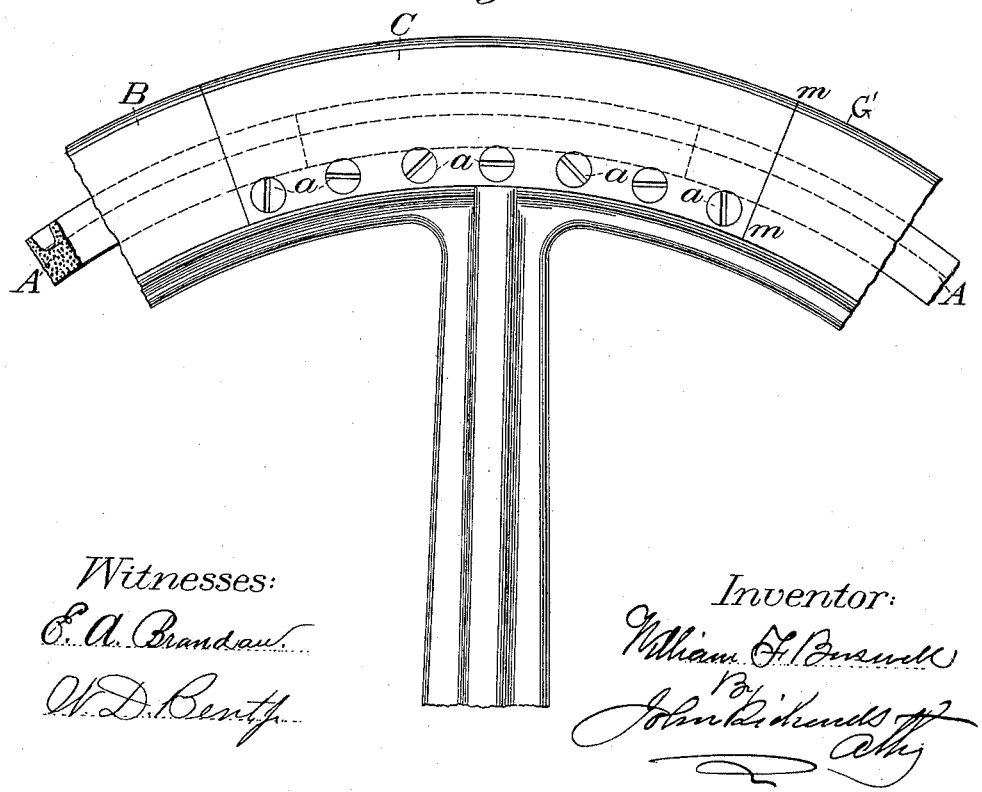
Witnesses:
E. A. Brandau
W. D. Bentz
Inventor:
William F. Buswell
By John Richards
Atty

UNITED STATES PATENT OFFICE.

WILLIAM F. BUSWELL, OF SAN FRANCISCO, CALIFORNIA.

PULLEY.

SPECIFICATION forming part of Letters Patent No. 469,512, dated February 23, 1892.

Application filed September 21, 1891. Serial No. 406,360. (No model.)

*To all whom it may concern:*

Be it known that I, WILLIAM F. BUSWELL, a citizen of the United States, residing in the city and county of San Francisco, State of California, have invented certain Improvements in Pulleys or Sheaves for Cables; and I hereby declare the following specification and the drawings accompanying the same to be a full and exact description of my invention.

My invention relates to pulleys or sheaves, especially such as are employed for wire ropes under heavy strain, as in the case of traction-cables for street-railways or in transmitting power by means of wire ropes or cables; and it consists in constructing such pulleys or sheaves with a series of inserted segments forming the bottom or wearing part of the groove or grooves in which the cables bear, the segments being of chilled iron or other hard material and so inserted and held as to be removed or replaced in whole or in part without disturbing the pulley or sheaves and while the rope is in place.

The object of my invention is twofold—mainly to avoid wear of the main parts of the sheaves or pulleys by inserting the portions embraced by the cable and subject to abrasion and wear, also to some extent obviate wear of the cables or ropes, which occurs when they bear on soft iron that retains sand or grit.

Referring to the drawings, Figure 1 is a transverse section through the rim of a pulley or sheave made according to my invention. Fig. 2 is a partial side view of a large pulley or sheave, showing the removable part of the side flange where the hardened segments are inserted. Figs. 3 and 4 show the ends of hard segments for two and three cables and wraps.

Similar letters of reference are employed to denote corresponding parts in the different figures of the drawings.

I am aware that pulleys or sheaves for ropes have been made with inserted segments or sections of soft material—such as wood or gum—to increase the traction of the ropes or to prevent abrasive wearing of the same; but such expedients are not required or applicable to sheaves or pulleys employed for cable railways or analogous purposes and when exposed to grit and dirt and also to high tension. These circumstancess call for hard obdurate material such as cannot be an integral part of the pulleys or wheels and which by my invention is supplied in the form of grooved dovetail sections of chilled iron or similar hard material inserted in corresponding grooves around the periphery of the wheels. The groove I form preferably by what are called "cores," that in casting displace the metal shown by the sections A, as in Figs. 1, 3, and 4, which represent the ends or cross-sections of segments formed of chilled gray or white cast-iron.

B is the main rim of a pulley or sheave, having a section or portion C of one flange loose or removable and held by screws $a$, that are preferably made with countersunk heads flush with the outer sides of the rim. The main rim B is provided with flanges $G'$ and $G^2$, as shown in Figs. 1 and 2. This part C of the flange $G'$ is made long enough so that when removed the space will receive the segments A, which can then be driven right and left from this point around the rim until the whole is filled, after which this plate or segment C is replaced and the wheel is symmetrical in all parts the same as if cast whole and in one piece.

The dovetail groove in which the chilled or hard segments A are inserted, as before explained, can be made perfect enough by careful molding without machine-turning the groove, and thus save considerable expense in making such wheels or pulleys. Any fins or small projections can be cut out by driving a sharp-cornered block of hardened steel of similar section around the groove in advance of inserting the segments A. These segments may be of any convenient length or of different lengths. If any are broken while inserting them, such breakage does not destroy their use or purpose so long as there are no wide spaces left between the different pieces or segments.

In the case of multiple wraps of the ropes or cable, as is common in the driving-pulleys employed for cable railways, the section A is made wider to contain the required number of grooves, as shown in Figs. 3 and 4, the construction and arrangement being otherwise the same as in the case of a single groove and as shown in Fig. 1.

In the case of small wheels, such as bearing pulleys or sheaves for supporting railway-cables in their straight portions, for deflecting them to suit grades or other similar purposes the detachable flange C can be made in one or more pieces and extend entirely around the pulley or sheave; but this construction I do not deem suitable for large wheels, such as are employed to drive railway-cables or change their course. In the large wheel (partially shown in Fig. 2) there may be one or more of these removable flange-sections C for convenience in taking out and replacing the sections A while the rope F is upon the wheel. The removable part C is held by screw-bolts *a* and has radial joints at the ends, as shown at *m m*, Fig. 2.

Having thus explained the nature and objects of my invention, what I claim as new, and desire to secure by Letters Patent, is—

In a pulley or sheave for use in connection with cable railways or similar apparatus, the combination of a pulley having its rim grooved in the usual manner for the reception of a cable by the provision of integral parallel flanges and having also another annular groove underlying the cable-groove and providing a circular passage of larger size than the base of the cable-groove, a series of inserted grooved segments of chilled iron or other hard material located within said circular passage and forming the bottom or wearing part of the groove in which the cable bears, the grooves of the inserted segments coming into coincidence with the inner opposing faces of the integral flanges, and a detachable section cut out of one of the integral flanges and readily removable to permit the placing or withdrawal of all the insertible segments at a single point in the periphery of the wheel, thereby enabling the manipulation of the segments in repairing to take place at any time without disturbing the pulley and while the cable is in place therein, substantially as and for the purpose described.

In testimony whereof I have hereunto affixed my signature in the presence of two witnesses.

WILLIAM F. BUSWELL.

Witnesses:
 JAMES L. KING,
 W. N. KEMPSTON.